United States Patent
George et al.

(10) Patent No.: US 9,612,948 B2
(45) Date of Patent: Apr. 4, 2017

(54) READS AND WRITES BETWEEN A CONTIGUOUS DATA BLOCK AND NONCONTIGUOUS SETS OF LOGICAL ADDRESS BLOCKS IN A PERSISTENT STORAGE DEVICE

(71) Applicant: SanDisk Technologies LLC, Plano, TX (US)

(72) Inventors: Johann George, Sunnyvale, CA (US); Aaron Olbrich, Morgan Hill, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 111 days.

(21) Appl. No.: 13/831,308

(22) Filed: Mar. 14, 2013

(65) Prior Publication Data

US 2014/0189264 A1  Jul. 3, 2014

Related U.S. Application Data (60) Provisional application No. 61/746,501, filed on Dec. 27, 2012.

(51) Int. Cl.
*G06F 12/00* (2006.01)
*G06F 3/06* (2006.01)

(52) U.S. Cl.
CPC ............ *G06F 12/00* (2013.01); *G06F 3/0611* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | |
|---|---|---|
| 4,173,737 A | 11/1979 | Skerlos et al. |
| 4,888,750 A | 12/1989 | Kryder et al. |
| 4,916,652 A | 4/1990 | Schwarz et al. |
| 5,129,089 A | 7/1992 | Nielsen |

(Continued)

FOREIGN PATENT DOCUMENTS

| | | |
|---|---|---|
| EP | 1 299 800 | 4/2003 |
| EP | 1465203 A1 | 10/2004 |

(Continued)

OTHER PUBLICATIONS

Canim, Buffered Bloom ilters on Solid State Storage, ADMS*10, Singapore, Sep. 13-17, 2010, 8 pgs.

(Continued)

*Primary Examiner* — Baboucarr Faal
(74) *Attorney, Agent, or Firm* — Morgan, Lewis & Bockius LLP (57) ABSTRACT

In the present disclosure, a persistent storage device includes both persistent storage, which includes a set of persistent storage blocks, and a storage controller. The persistent storage device stores and retrieves data in response to commands received from an external host device. The persistent storage device stores data, from a contiguous data block, to two or more sets of logical address blocks in persistent storage. The persistent storage device also retrieves data, corresponding to a contiguous data block, from two or more sets of logical address blocks in persistent. In both instances, the two or more sets of logical address blocks in persistent storage, in aggregate, are not contiguous.

21 Claims, 6 Drawing Sheets

(56) References Cited

U.S. PATENT DOCUMENTS

| | | |
|---|---|---|
| 5,270,979 A | 12/1993 | Harari et al. |
| 5,329,491 A | 7/1994 | Brown et al. |
| 5,381,528 A | 1/1995 | Brunelle |
| 5,404,485 A | 4/1995 | Ban |
| 5,488,702 A | 1/1996 | Byers et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,104,304 A | 8/2000 | Clark et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,678,788 B1 | 1/2004 | O'Connell |
| 6,728,879 B1 | 4/2004 | Atkinson |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,934,755 B1 | 8/2005 | Saulpaugh et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,275,170 B2 | 9/2007 | Suzuki |
| 7,295,479 B2 | 11/2007 | Yoon et al. |
| 7,328,377 B1 | 2/2008 | Lewis et al. |
| 7,486,561 B2 | 2/2009 | Mokhlesi |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,261,020 B2 | 9/2012 | Krishnaprasad et al. |
| 8,312,349 B2 | 11/2012 | Reche et al. |
| 8,385,117 B2 | 2/2013 | Sakurada et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,832,384 B1 | 9/2014 | de la Iglesia |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,043,517 B1 | 5/2015 | Sprouse et al. |
| 9,128,690 B2 | 9/2015 | Lotzenburger et al. |
| 9,329,789 B1 | 5/2016 | Chu et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |

(56) References Cited

U.S. PATENT DOCUMENTS

| | | |
|---|---|---|
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |

(56) References Cited

U.S. PATENT DOCUMENTS

| | | |
|---|---|---|
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1* | 1/2011 | Lund .............. G06F 12/0246 711/103 |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1* | 5/2012 | Sheffler .............. G11C 7/22 711/103 |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |

(56) References Cited

U.S. PATENT DOCUMENTS

| | | | |
|---|---|---|---|
| 2013/0238576 | A1 | 9/2013 | Binkert et al. |
| 2013/0254498 | A1 | 9/2013 | Adachi et al. |
| 2013/0254507 | A1 | 9/2013 | Islam et al. |
| 2013/0258738 | A1 | 10/2013 | Barkon et al. |
| 2013/0265838 | A1 | 10/2013 | Li |
| 2013/0282955 | A1 | 10/2013 | Parker et al. |
| 2013/0290611 | A1 | 10/2013 | Biederman et al. |
| 2013/0297613 | A1 | 11/2013 | Yu |
| 2013/0301373 | A1 | 11/2013 | Tam |
| 2013/0304980 | A1 | 11/2013 | Nachimuthu et al. |
| 2013/0314988 | A1 | 11/2013 | Desireddi et al. |
| 2013/0343131 | A1 | 12/2013 | Wu et al. |
| 2013/0346672 | A1 | 12/2013 | Sengupta et al. |
| 2014/0013027 | A1* | 1/2014 | Jannyavula Venkata ............... G06F 12/0866 711/103 |
| 2014/0013188 | A1 | 1/2014 | Wu et al. |
| 2014/0025864 | A1 | 1/2014 | Zhang et al. |
| 2014/0032890 | A1 | 1/2014 | Lee et al. |
| 2014/0063905 | A1 | 3/2014 | Ahn et al. |
| 2014/0067761 | A1 | 3/2014 | Chakrabarti et al. |
| 2014/0071761 | A1 | 3/2014 | Sharon et al. |
| 2014/0075133 | A1 | 3/2014 | Li et al. |
| 2014/0082261 | A1 | 3/2014 | Cohen et al. |
| 2014/0082310 | A1 | 3/2014 | Nakajima |
| 2014/0082456 | A1 | 3/2014 | Liu |
| 2014/0082459 | A1 | 3/2014 | Li et al. |
| 2014/0095775 | A1 | 4/2014 | Talagala et al. |
| 2014/0101389 | A1 | 4/2014 | Nellans et al. |
| 2014/0115238 | A1 | 4/2014 | Xi et al. |
| 2014/0122818 | A1 | 5/2014 | Hayasaka et al. |
| 2014/0122907 | A1 | 5/2014 | Johnston |
| 2014/0136762 | A1 | 5/2014 | Li et al. |
| 2014/0136883 | A1 | 5/2014 | Cohen |
| 2014/0136927 | A1 | 5/2014 | Li et al. |
| 2014/0143505 | A1 | 5/2014 | Sim et al. |
| 2014/0153333 | A1 | 6/2014 | Avila et al. |
| 2014/0157065 | A1 | 6/2014 | Ong |
| 2014/0173224 | A1 | 6/2014 | Fleischer et al. |
| 2014/0181458 | A1 | 6/2014 | Loh et al. |
| 2014/0201596 | A1 | 7/2014 | Baum et al. |
| 2014/0223084 | A1 | 8/2014 | Lee et al. |
| 2014/0244578 | A1 | 8/2014 | Winkelstraeter |
| 2014/0258755 | A1 | 9/2014 | Stenfort |
| 2014/0269090 | A1 | 9/2014 | Flynn et al. |
| 2014/0310494 | A1 | 10/2014 | Higgins et al. |
| 2014/0359381 | A1 | 12/2014 | Takeuchi et al. |
| 2015/0023097 | A1 | 1/2015 | Khoueir et al. |
| 2015/0032967 | A1 | 1/2015 | Udayashankar et al. |
| 2015/0037624 | A1 | 2/2015 | Thompson et al. |
| 2015/0153799 | A1 | 6/2015 | Lucas et al. |
| 2015/0153802 | A1 | 6/2015 | Lucas et al. |
| 2015/0212943 | A1 | 7/2015 | Yang et al. |
| 2015/0268879 | A1 | 9/2015 | Chu |
| 2015/0286438 | A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 | 6/2008 |
| WO | WO 2008/121553 | 10/2008 |
| WO | WO 2008/121577 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Jan. 21, 2015, received in International Application No. PCT/US2014/059748, which corresponds to U.S. Appl. No. 14/137,511, 13 pages (Dancho).
International Search Report and Written Opinion dated Feb. 18, 2015, received in International Application No. PCT/US2014/066921, which corresponds to U.S. Appl. No. 14/135,260, 13 pages (Fitzpatrick).
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
International Search Report and Written Opinion dated Mar. 9, 2015, received in International Patent Application No. PCT/US2014/059747, which corresponds to U.S. Appl. No. 14/137,440, 9 pages (Fitzpatrick).
Barr, Introduction to Watchdog Timers, Oct. 2001, 3 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 16, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 9 pgs.
Pliant Technology, Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 8 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042775, Sep. 26, 2012, 9 pgs.
SanDisk Enterprise IP LLC, International Search Report / Written Opinion, PCT/US2012/059459, Feb. 14, 2013, 9 pgs.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.

(56) References Cited

OTHER PUBLICATIONS

SanDisk Enterprise IP LLC, Office Action, JP 2010-540863, Jul. 24, 2012, 3 pgs.
Watchdog Timer and Power Savin Modes, Microchip Technology Inc., 2005.
Zeidman, 1999 Verilog Designer's Library, 9 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
International Search Report and Written Opinion dated Jul. 25, 2014, received in International Patent Application No. PCT/US2014/029453, which corresponds to U.S. Appl. No. 13/963,444, 9 pages (Frayer).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/U52013/074779, which corresponds to U.S. Appl. No. 13/831,374, 8 pages (George).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages (Ellis).
Bayer, "Prefix B-Trees", ip.com Journal, ip.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Lee et al., "A Semi-Preemptive Garbage Collector for Solid State Drives," Apr. 2011, IEEE, pp. 12-21.
Oracle, "Oracle9i: Database Concepts", Jul. 2001, http://docs.oracle.com/cd/A91202_01/901_doc/server.901/a88856.pdf, 49 pages.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Sep. 14, 2015, received in International Patent Application No. PCT/US2015/036807, which corresponds to U.S. Appl. No. 14/311,152, 9 pages (Higgins).
Gasior, "Gigabyte's i-Ram storage device, Ram disk without the fuss," The Tech Report, p. 1, Jan. 25, 2006, 5 pages.
IBM Research-Zurich, "The Fundamental Limit of Flash Random Write Performance: Understanding, Analysis and Performance Modeling," Mar. 31, 2010, pp. 1-15.
Oestreicher et al., "Object Lifetimes in Java Card," 1999, USENIX, 10 pages.
Office Action dated Apr. 25, 2016, received in Chinese Patent Application No. 201280066282.4, which corresponds to U.S. Appl. No. 13/602,047, 8 pages (Tai).
International Preliminary Report on Patentability dated May 24, 2016, received in International Patent Application No. PCT/US2014/065987, which corresponds to U.S. Appl. No. 14/135,400, 9 pages. (George).

\* cited by examiner

READS AND WRITES BETWEEN A CONTIGUOUS DATA BLOCK AND NONCONTIGUOUS SETS OF LOGICAL ADDRESS BLOCKS IN A PERSISTENT STORAGE DEVICE

RELATED APPLICATIONS

This application claims priority to U.S. Provisional Patent Application No. 61/746,501, filed Dec. 27, 2012, which is hereby incorporated by reference in its entirety.

TECHNICAL FIELD

The disclosed embodiments relate generally to storage devices.

BACKGROUND

It is well known that logically contiguous storage provides for more efficient execution of input/output operations than logically noncontiguous storage. However, over time and as more operations are performed, storage typically becomes fragmented, thus leading to less efficient operations.

The embodiments described herein provide mechanisms and methods for more efficient reads and writes to storage devices.

SUMMARY

In the present disclosure, a persistent storage device includes persistent storage, which includes a set of persistent storage blocks, and a storage controller. The persistent storage device stores and retrieves data in response to commands received from an external host device. The persistent storage device stores data, from a contiguous data block, to two or more sets of logical address blocks in persistent storage. The persistent storage device also retrieves data, corresponding to a contiguous data block, from two or more sets of logical address blocks in persistent storage. In both instances, the two or more sets of logical address blocks in persistent storage, in aggregate, are not contiguous.

BRIEF DESCRIPTION OF THE DRAWINGS

Like reference numerals refer to corresponding parts throughout the drawings.

DESCRIPTION OF EMBODIMENTS

In some embodiments, data stored by a host device in persistent storage becomes fragmented over time. When that happens, it is difficult to allocate contiguous storage. In some embodiments, applications on the host cause the host to perform input/output (I/O) operations using non-contiguous data stored in persistent storage. In such embodiments, performing I/O operations using non-contiguous data is less efficient than performing I/O operations using contiguous blocks of data. In some embodiments, the host defragments data once it has become fragmented. For example, in some cases, the host suspends all applications and runs processes for defragmenting data in persistent storage. In that case, an application cannot perform an operation until the defragmentation processes are complete. In another example, the host runs the defragmentation processes while an application is still running Because the defragmentation processes are running simultaneously with the application, the application's performance slows down. In both cases, the time for an application to complete an operation increases, thereby decreasing efficiency.

In the present disclosure, a persistent storage device includes persistent storage, which includes a set of persistent storage blocks, and a storage controller. The storage controller is configured to store and retrieve data in response to commands received from an external host device. The storage controller is also configured to respond to a host write command by storing data from a write data contiguous data block to persistent storage blocks corresponding to two or more sets of logical address blocks specified by the host write command. Each set of logical address blocks specified by the host write command includes a set of contiguous logical address blocks, where the two or more sets of logical address blocks specified by the host write command, in aggregate, are not contiguous. The storage controller is further configured to respond to a host read command by retrieving data corresponding to a read data contiguous data block from persistent storage blocks corresponding to two or more sets of logical address blocks specified by the host read command. Each set of logical address blocks specified by the host read command includes a set of contiguous logical address blocks, where the two or more sets of logical address blocks specified by the host read command, in aggregate, are not contiguous.

In some embodiments, the storage controller is further configured to execute the host write command or the host read command atomically. In some embodiments, the host write command specifies storage of a first block of data to a first persistent storage block corresponding to a first logical address block and storage of a second block of data to a second persistent storage block corresponding to a second logical address block, where the first and second blocks of data are contiguously stored in the write data contiguous data block, and wherein the first and second logical address blocks are noncontiguous. Similarly, in some embodiments, the host read command specifies retrieval of a first block of data from a first persistent storage block corresponding to a first logical address block and retrieval of a second block of data from a second persistent storage block corresponding to a second logical address block, where the first and second blocks of data are, after retrieval, contiguously stored in the read data contiguous data block, and wherein the first and second logical address blocks are noncontiguous. In some embodiments, the persistent storage device is implemented as a single, monolithic integrated circuit. In some embodiments, the persistent storage device also includes a host interface for interfacing the persistent storage device to a memory controller of the external host device.

In some embodiments, the persistent storage device includes a logical address to physical address map for associating logical block addresses with persistent storage blocks in the persistent storage device. In some embodiments, the two or more sets of logical address blocks specified by the host write command comprise logical block addresses, each associated with a corresponding persistent storage block, and the corresponding persistent storage blocks are identified by the storage controller using a logical block address to physical address mapping. Optionally, the write data contiguous data block or the read data contiguous data block corresponds to a contiguous data block in memory on the external host device.

In another aspect of the present disclosure, a method for managing a persistent storage device is provided. In some embodiments, the method is performed at the persistent storage device, which includes persistent storage and a storage controller. The persistent storage includes a set of persistent storage blocks. The method includes responding to a host write command received from an external host device by storing data from a write data contiguous data block to persistent storage blocks corresponding to two or more sets of logical address blocks specified by the host write command. Each set of logical address blocks specified by the host write command includes a set of contiguous logical address blocks, where the two or more sets of logical address blocks specified by the host write command, in aggregate, are not contiguous. The method further includes responding to a host read command by retrieving data corresponding to a read data contiguous data block from persistent storage blocks corresponding to two or more sets of logical address blocks specified by the host read command. Each set of logical address blocks specified by the host read command includes a set of contiguous logical address blocks, where the two or more sets of logical address blocks specified by the host read command, in aggregate, are not contiguous.

In yet another aspect of the present disclosure, a non-transitory computer readable storage medium stores one or more programs for execution by a storage controller of a persistent storage device. Execution of the one or more programs by the storage controller causes the storage controller to perform any of the methods described above.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
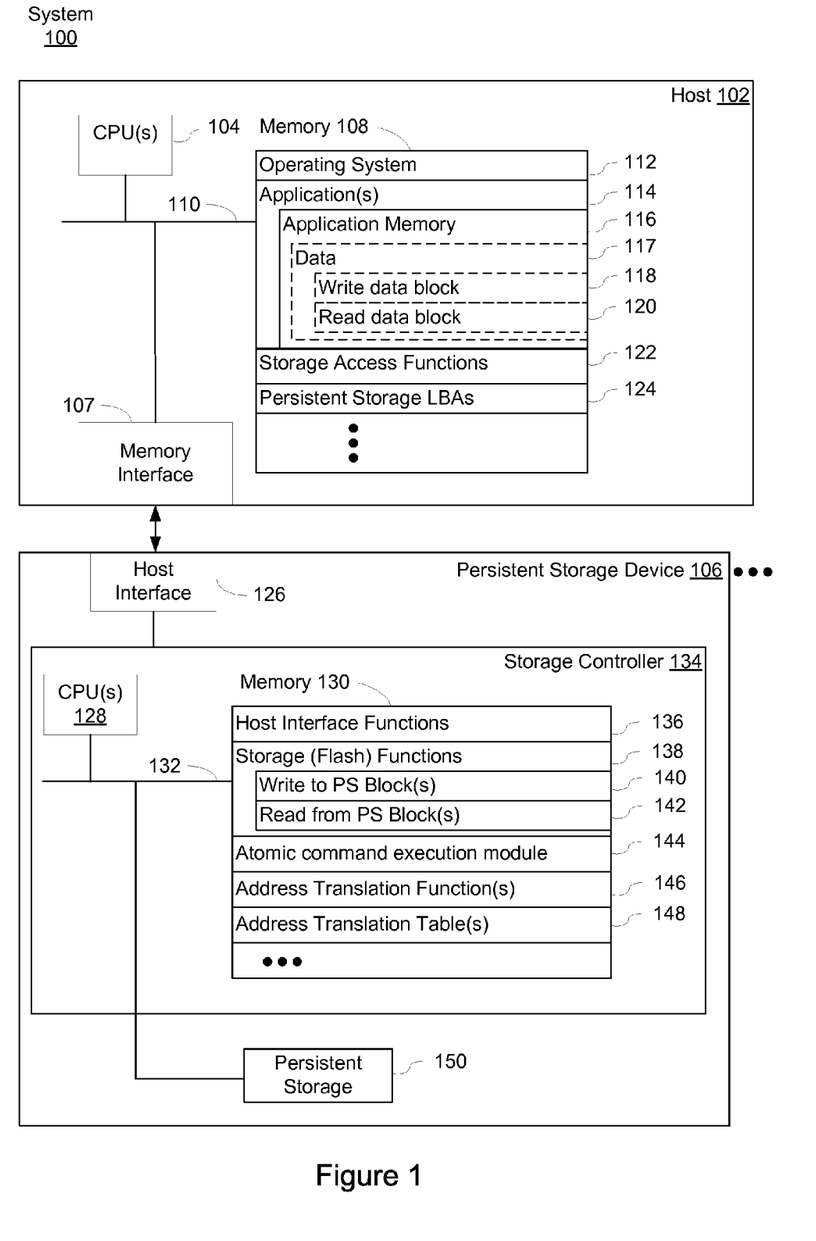
FIG. 1 is a block diagram illustrating a system that includes a persistent storage device and an external host device, in accordance with some embodiments.

FIG. 1 is a block diagram illustrating a system 100 that includes a persistent storage device 106 and an external host device 102 (sometimes herein called host 102), in accordance with some embodiments. For convenience, host 102 is herein described as implemented as a single server or other single computer. Host 102 includes one or more processing units (CPU's) 104, one or more memory interfaces 107, memory 108, and one or more communication buses 110 for interconnecting these components. The communication buses 110 optionally include circuitry (sometimes called a chipset) that interconnects and controls communications between system components. Memory 108 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Further, memory 108 optionally includes one or more storage devices remotely located from the CPU(s) 104. Memory 108, or alternately the non-volatile memory device(s) within memory 108, includes a non-volatile computer readable storage medium. In some embodiments, memory 108 or the non-volatile computer readable storage medium of memory 108 stores the following programs, modules and data structures, or a subset thereof:

an operating system 112 that includes procedures for handling various basic system services and for performing hardware dependent tasks;

one or more applications 114 which are configured to (or include instructions to) submit read and write commands to persistent storage device 106 using storage access functions 122 and persistent storage LBAs 124; one or more applications 114 optionally utilizes application memory 116 to store data 117, for example data used by or associated with one of the applications 114; data 117 optionally includes write data, to be written to persistent storage 150 in persistent storage device 106 from write data block 118, and/or read data that has been retrieved from persistent storage 150 in persistent storage device 106 to be stored in read data block 120; in some implementations, write data block 118 and read data block 120 are each a contiguous block of data.

storage access functions 122 for reading and writing to persistent storage 150 of persistent storage device 106; and persistent storage LBAs 124 for maintaining a mapping of which logical block addresses, corresponding to persistent storage blocks in persistent storage 150, contain what data.

Each of the aforementioned host functions, such as storage access functions 122, is configured for execution by the one or more processors (CPUs) 104 of host 102, so as to perform the associated storage access task or function with respect to persistent storage 150 in persistent storage device 106.

In some embodiments, host 102 is connected to persistent storage device 106 via a memory interface 107 of host 102 and a host interface 126 of persistent storage device 106. Host 102 is connected to persistent storage device 106 either directly or through a communication network (not shown) such as the Internet, other wide area networks, local area networks, metropolitan area networks, wireless networks, or any combination of such networks. Optionally, in some implementations, host 102 is connected to a plurality of persistent storage devices 106, only one of which is shown in FIG. 1.

In some embodiments, persistent storage device 106 includes persistent storage 150, one or more host interfaces 126, and storage controller 134. Storage controller 134 includes one or more processing units (CPU's) 128, memory 130, and one or more communication buses 132 for interconnecting these components. In some embodiments, communication buses 132 include circuitry (sometimes called a chipset) that interconnects and controls communications between system components. Memory 130 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 130 optionally includes one or more storage devices remotely located from the CPU(s) 128. Memory 130, or alternately the non-volatile memory device(s) within memory 130, includes a non-volatile computer readable storage medium. In some embodiments, memory 130 stores the following programs, modules and data structures, or a subset thereof:

- host interface functions 136 that include procedures for handling commands sent from host 102 and received by persistent storage device 106 via its host interface 126;
- storage (flash) functions 138 for handling persistent storage access commands issued by host 102; the storage functions 138 include a function 140 to write data to one or more specified persistent storage blocks and a function 142 to read data from one more specified persistent storage blocks;
- atomic command execution module 144 for executing host read and host write commands, received from host 102, atomically;
- one or more address translation functions 146 for translating logical block addresses to physical addresses; and
- one or more address translation tables 148 for storing logical to physical address mapping information.

Each of the aforementioned storage controller functions, such as storage functions 138, is configured for execution by the one or more processors (CPUs) 128 of storage controller 134, so as to perform the associated task or function with respect to persistent storage 150.

Address translation function(s) 146 together with address translation tables 148 implement logical block address (LBA) to physical address (PHY) mapping, shown as LBA to PHY mapping 206 in FIG. 2.

As used herein, the term "atomic" refers to an operation that either succeeds as a whole, or fails as a whole. For example, an atomic execution of a write command specifying two blocks of write data will not be interrupted until either both blocks of write data are written, or the operation fails and neither block is written. Thus, the atomic execution of the write command in the given example will end in either a write completion of both blocks of data, or a failure to write any blocks of data. In such an example, an atomic execution of the write command will not result in a partial completion, i.e., write completion of only one block of write data.

As used herein, the term "persistent storage" refers to any type of persistent storage used as mass storage or secondary storage. In some embodiments, persistent storage is flash memory. In some implementations, persistent storage 150 includes a set of persistent storage blocks.

In some embodiments, commands issued by host 102, using the storage access functions 122 described above, are implemented as input/output control (ioctl) function calls, for example Unix or Linux ioctl function calls or similar function calls implemented in other operating systems. In some embodiments, commands are issued to persistent storage device 106 as a result of function calls by host 102.

An example of a command issued by host 102 to write data (e.g., data 117 stored in application memory 116 in memory 108 of host 102) to one or more persistent storage blocks, for invoking the write to persistent storage block function 140 in persistent storage device 106, is given by:

vwrite(buf, block1, count1, block2, count2, . . . )

where buf refers to a location in application memory 116 in memory 108 on host 102 containing data to be written, block1 refers to a starting position in persistent storage 150 to which count1 blocks of data, starting at buf, is to be written, and block2 refers to a starting position in persistent storage 150 to which count2 blocks of data is to be written, the count2 blocks of data following the count1 blocks of data in a contiguous block of data starting at buf. The number of (block, count) pairs in the vwrite command has no specific limit, and can generally range from two pairs to several dozen pairs or, optionally, hundreds of pairs, depending on the implementation.

In specific examples of calls to vwrite illustrated below, the values of the "block#" fields refer to logical block addresses, which correspond to the starting positions of the specified logical address blocks. For example, if the block1 field of a write command has a value of 2, then the write command indirectly specifies a set of persistent storage blocks, the number of which is given by the count1 field, by specifying a set of logical block addresses starting at logical block address 2. Thus, for example, if the count1 field had a value of 4, then the write command specifies that 4 blocks of data be written to the persistent storage blocks associated with the 4 logical block addresses (e.g., logical block addresses 2, 3, 4, and 5) starting at the specified logical block address, 2.

In some implementations, buf indicates the starting location of write data block 118. In some implementations, the count1 blocks of data to be written to block1 and the count2 blocks of data to be written to block2 are contiguously stored in write data block 118, starting at buf. In some implementations, the count1 blocks of data to be written to block1 and the count2 blocks of data to be written to block2 are only a portion of write data block 118. In some implementations, the starting locations, block1 and block2, are logical block addresses, and count1 and count2 refer to integer numbers of blocks of data to be written. Each of the aforementioned blocks of data has a size corresponding to the size of a respective persistent storage block.

In some implementations, for either vwrite and vread (described below), or both, a first set of logical address blocks, defined by block1 and count1, and a second set of persistent storage blocks, defined by block2 and count2, are neighboring sets of logical address blocks, but are not contiguous in aggregate because they have a different order from the corresponding data blocks in application memory 116. An example of such a implementation would be a vwrite command in which (block1, count1) is equal to (2,2) and (block2, count2) is equal to (0,2).

An example of a command issued by host 102 to read data from one or more persistent storage blocks, for invoking the read from persistent storage block function 142 in persistent storage device 106, is given by:

vread(buf, block1, count1, block2, count2, . . . )

where buf refers to a location in application memory 116 in memory 108 on host 102 into which the read data is to be stored, block1 refers to a starting position (e.g., a first logical block address) in persistent storage 150 from which count1 blocks of data is to be read into application memory 116 starting at location buf, and block2 refers to a starting position (e.g., a second logical block address) in persistent storage 150 from which count2 blocks of data is to be read into application memory 116 starting at a position that is count1 blocks of data after buf. The number of (block, count) pairs in the vwrite command has no specific limit, and can generally range from two pairs to several dozen pairs or, optionally, hundreds of pairs, depending on the implementation.

Similarly to the host write command issued by host 102 to write data to one or more persistent storage blocks, in some implementations, the buf parameter of the vread ( ) host read command indicates the starting location of read data block 120. In some implementations, the count1 blocks of data to be read from block1 and the count2 blocks of data to be read from block2 are stored in read data block 118, in a contiguous block starting at buf. In some implementations, the count1 blocks of data to be read from block1 and the count2 blocks of data to be read from block2 are only a portion of read data block 120. As with vwrite, in some implementations the starting locations, block1 and block2, are logical block addresses, and count1 and count2 refer to integer numbers of blocks of data to be read and conveyed to host 102. As described above with reference to specific examples of vwrite, in specific examples of vread given below, the values of the "block#" fields refer to logical block addresses.

Each of the above identified modules, applications or programs corresponds to a set of instructions, executable by the one or more processors of host 102 or persistent storage device 106, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 108 or memory 130 optionally stores a subset of the modules and data structures identified above. Furthermore, in some implementations, memory 108 or memory 130 optionally stores additional modules and data structures not described above.

Although FIG. 1 shows a system 100 including host 102 and persistent storage device 106, FIG. 1 is intended more as a functional description of the various features which may be present in a set of servers than as a structural schematic of the embodiments described herein. In practice, and as recognized by those of ordinary skill in the art, items shown separately could be combined and some items could be separated.

Figure 2A:
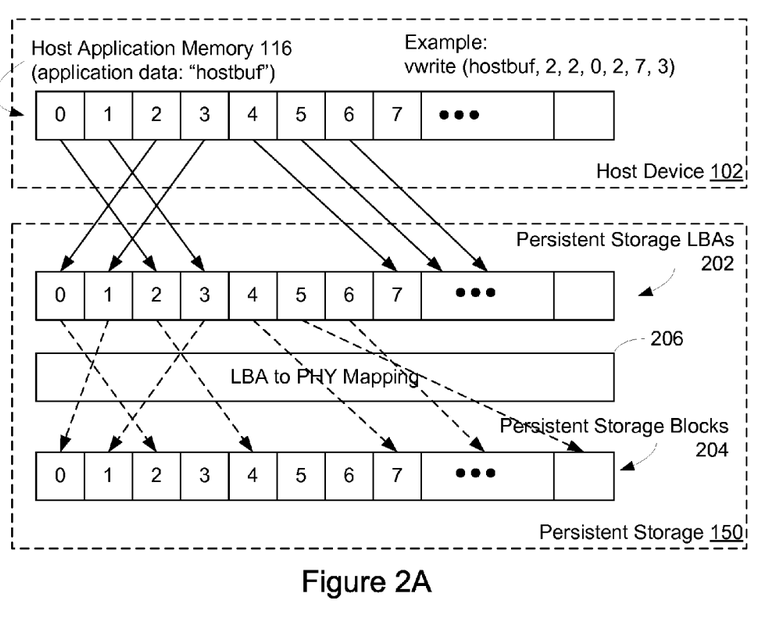
FIG. 2A is a schematic diagram corresponding to processing a write command that stores data from a contiguous block in host memory on a host device to two or more sets of logical address blocks in a persistent storage device, in accordance with some embodiments.
Figure 2B:
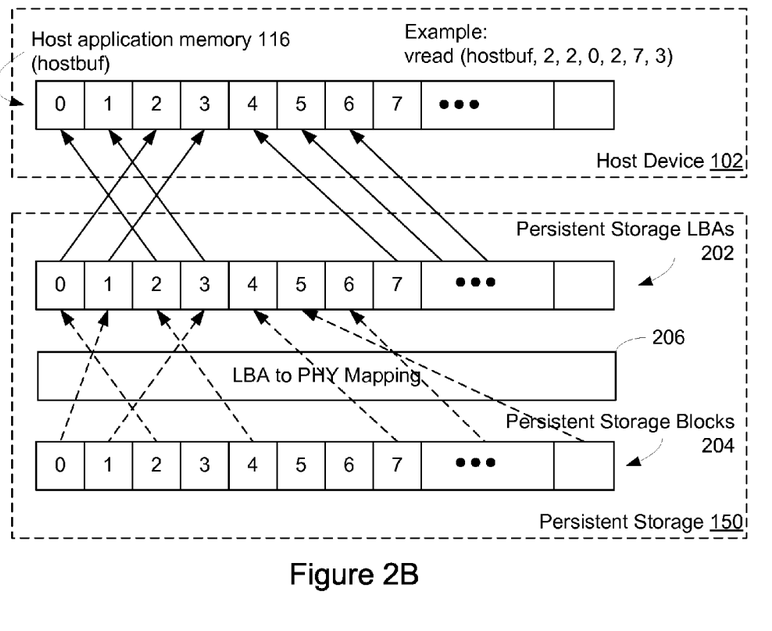
FIG. 2B is a schematic diagram corresponding to processing a read command that retrieves data from two or more sets of logical address blocks in a persistent storage device and stores the data to a contiguous block in host memory on a host device, in accordance with some embodiments.

FIGS. 2A and 2B illustrate a schematic diagram of host device 102 and persistent storage 150, in accordance with some embodiments. As illustrated in FIGS. 2A and 2B, host 102 contains data that has been stored, starting at position "hostbuf," in application memory 116 of memory 108. In some embodiments, with respect to FIG. 2A, data blocks 0-6 of application memory 116 form write data block 118. In some embodiments, with respect to FIG. 2B, data blocks 0-6 of application memory 116 form read data block 120. As mentioned above, in some embodiments, write data block 118 or read data block 120 is contiguous. In FIGS. 2A and 2B, persistent storage 150 maps persistent storage LBAs 202 to persistent storage blocks 204 via LBA to PHY mapping 206. As used herein, the term "persistent storage blocks" refers to the physical address blocks of persistent storage 150.

As described above with reference to FIG. 1, host 102 issues a write command (sometimes herein called a host write command) or a read command (sometimes herein called a host read command). In some embodiments, the write command results from an instance of a call by a host application to the vwrite function, as described above. In some embodiments, the read command results from an instance of a call by a host application to the vread function, as described above. In some embodiments, the read/write command is issued by one or more CPU(s) 104 of host 102 through memory interface 107 and received by storage controller 134 via host interface 126.

FIG. 2A shows an example a write command issued by host 102 via the function call vwrite (hostbuf, 2, 2, 0, 2, 7, 3). In this example, hostbuf represents a starting position in application memory 116. The write command specifies that two blocks of data, starting at block 2 of host application memory 116, be stored in the persistent storage blocks corresponding to logical block addresses starting at 0 (i.e., logical block address 0 and 1). The write command also specifies that two blocks of data, starting two blocks after the starting position of hostbuf in application memory 116, be stored in the persistent storage blocks corresponding to logical block addresses starting at 2 (i.e., logical block addresses 2-3). Last, the write command specifies that three blocks of data, starting four blocks after the starting position of hostbuf in host application memory 116, be stored in the persistent storage blocks corresponding to logical block addresses starting at 7 (i.e., logical block addresses 7-9).

When the persistent storage device 106 receives a write command, to write data into specified persistent storage blocks of persistent storage device 106 from a contiguous write data block 118 (e.g., a command that invokes the write to PS block function 140), storage controller 134 identifies the persistent storage blocks specified by the write command and stores the write data to the persistent storage blocks corresponding to the logical block address specified by the write command. As mentioned above, logical block addresses are mapped to physical addresses through LBA to PHY mapping 206, using address translation function(s) 146 and address translation table(s) 148.

FIG. 2B shows an example of a read command issued by host 102 via the function call vread (hostbuf, 2, 2, 0, 2, 7, 3). In this example, hostbuf represents a starting position in application memory 116. The read command specifies that two blocks of data, stored in the persistent storage blocks corresponding to the logical block addresses starting at 2, be stored in application memory 116 at position hostbuf in application memory 116. The read command also specifies that two blocks of data, stored in the persistent storage blocks corresponding to the logical block addresses starting at 0, be stored in application memory 116 at the position immediately following the two blocks of data stored in application memory 116 starting at position hostbuf. Last, the read command specifies that three blocks of data, stored in the persistent storage blocks corresponding to the logical block addresses starting at 7, be stored in application memory 116 at the position immediately following the four blocks of data stored in application memory 116 starting at position hostbuf.

In some implementations, the storing of data blocks into application memory 116 occurs in the order specified by the command. In some other implementations, the order in which data is stored into application memory can vary, as long as the resulting positions of the data blocks in application memory 116, after execution of the read command, match the positions of the data blocks specified by the host read command. For example, in some embodiments, in the example given above with reference to FIG. 2B, the data in the two persistent storage blocks corresponding to logical block addresses starting at 0 are read and stored in application memory 116 before the data in the two persistent storage blocks starting at logical block 2 are read and stored in application memory 116, as long as the two data blocks read from the persistent storage blocks starting at logical block 0 are stored at the position in application memory 116 two blocks after the starting position, hostbuf.

Figure 3A:
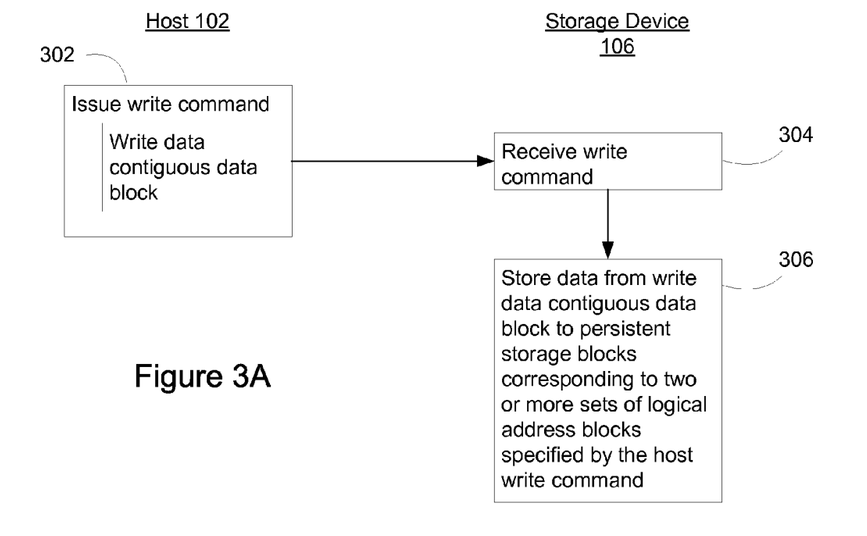
FIG. 3A-3B are flow diagrams illustrating the processing of host commands by a persistent storage device, in accordance with some embodiments.
Figure 3B:
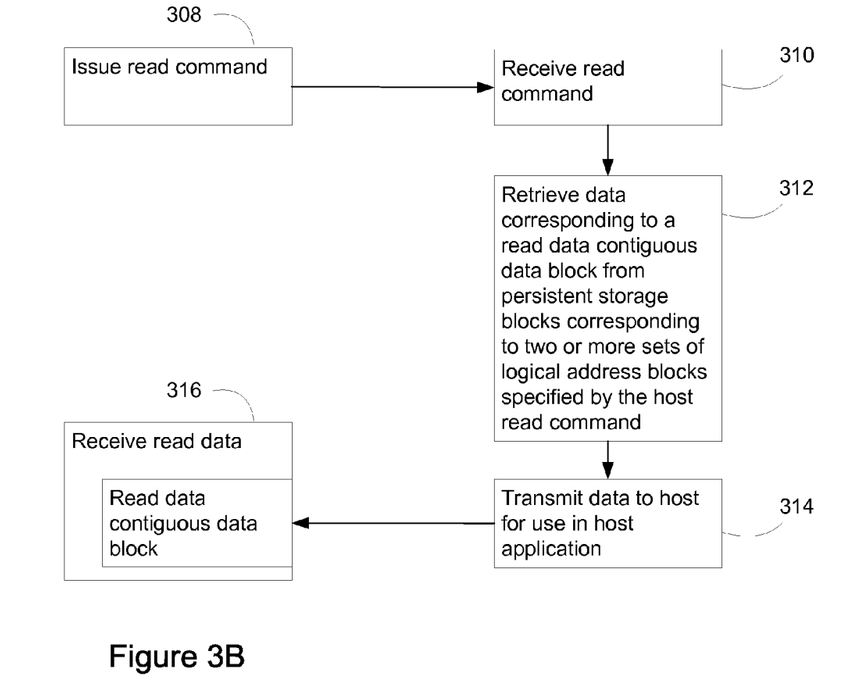

FIGS. 3A and 3B are flow diagrams illustrating the processing of host commands received from host 102 by persistent storage device 106, in accordance with some embodiments. As mentioned above, in some implementations, the host commands are received from host 102 by persistent storage device 106 via host interface 126. In some implementations, the host commands are function calls issued by host 102 when applications 114 invoke storage access functions 122 so as to read data from or write data to persistent storage device 106.

FIG. 3A illustrates the processing of a write command. Host 102 first issues (302) a write command to write data to one or more persistent storage blocks. In some embodiments, the write command, e.g., vwrite (buf, block1, count1, block2, count2, . . . ), is issued by host 102 when an application 114 executes a corresponding one of the storage access functions 122. Persistent storage device 106 receives the write command (304). In response, storage controller 134 of persistent storage device 106 stores (306) the write data to persistent storage blocks corresponding to two or more sets of logical address blocks specified by the host write command. In some embodiments, storage controller 134 stores the write data by executing function 140 so as to write data the specified persistent storage blocks. In some embodiments, the data specified by the write command is stored in write data block 118 in application memory 116 on host 102. In some embodiments, write data block 118 is a contiguous data block.

FIG. 3B illustrates the processing of a read command. Host 102 issues (308) a read command to read data from one or more persistent storage blocks. In some embodiments, the read command is issued by host 102 when an application 114 executes a corresponding one of the storage access functions 122. Persistent storage device 106 receives (310) the read command. In response to the persistent storage read command, persistent storage device 106 retrieves (312) data stored in persistent storage blocks corresponding to two or more sets of logical address blocks specified by the host read command. In some embodiments, the retrieved data corresponds to a read data contiguous data block. In some embodiments, the specified persistent storage blocks are identified using a logical block address to physical address mapping (e.g., mapping 206) to map logical addresses (e.g., logical block addresses) specified by the received read command to corresponding physical addresses. In some embodiments, storage controller 134 retrieves the read data from the specified persistent storage blocks and returns the data to host 102 via host interface 126. More specifically, in some embodiments, storage controller 134 of persistent storage device 106 reads the data from the specified persistent storage blocks and returns the read data to host 102, where the read data is received (316) by storage controller 134 and stored in read data block 120 in application memory 116 of memory 108. As with write data block 118, in some embodiments, read data block 120 is a contiguous data block.

Figure 4A:
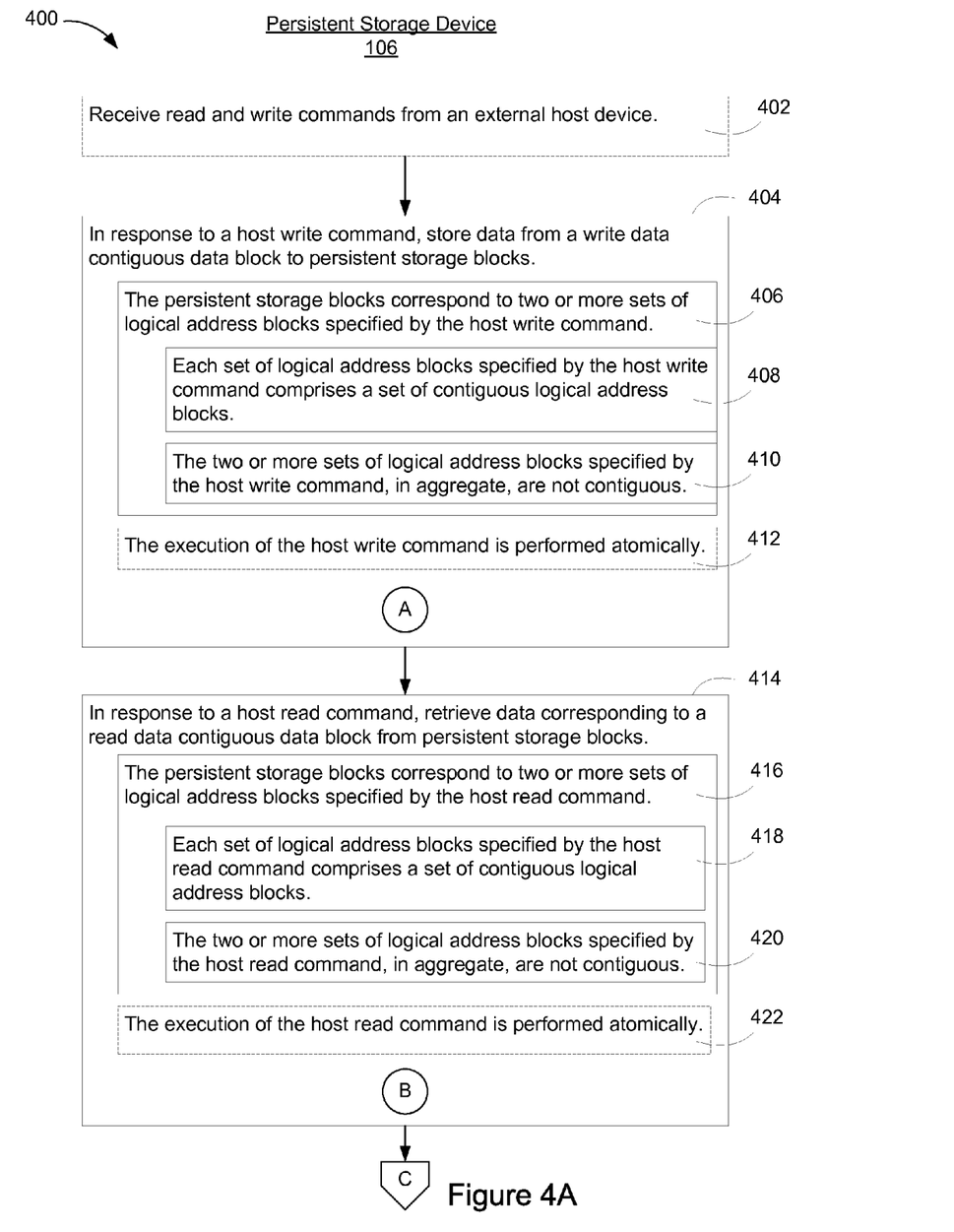
FIGS. 4A-4C illustrate a flow diagram of a process for managing a persistent storage device, including processing host read and write commands, in accordance with some embodiments.
Figure 4B:
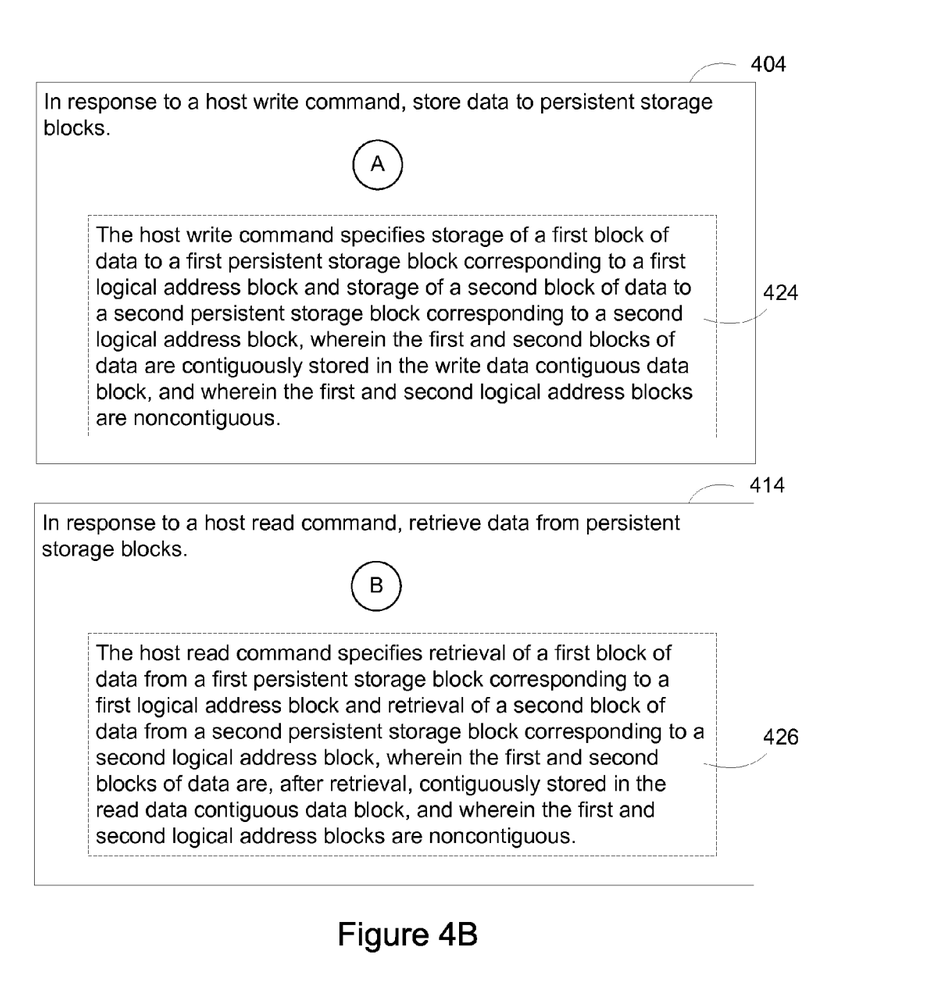
Figure 4C:
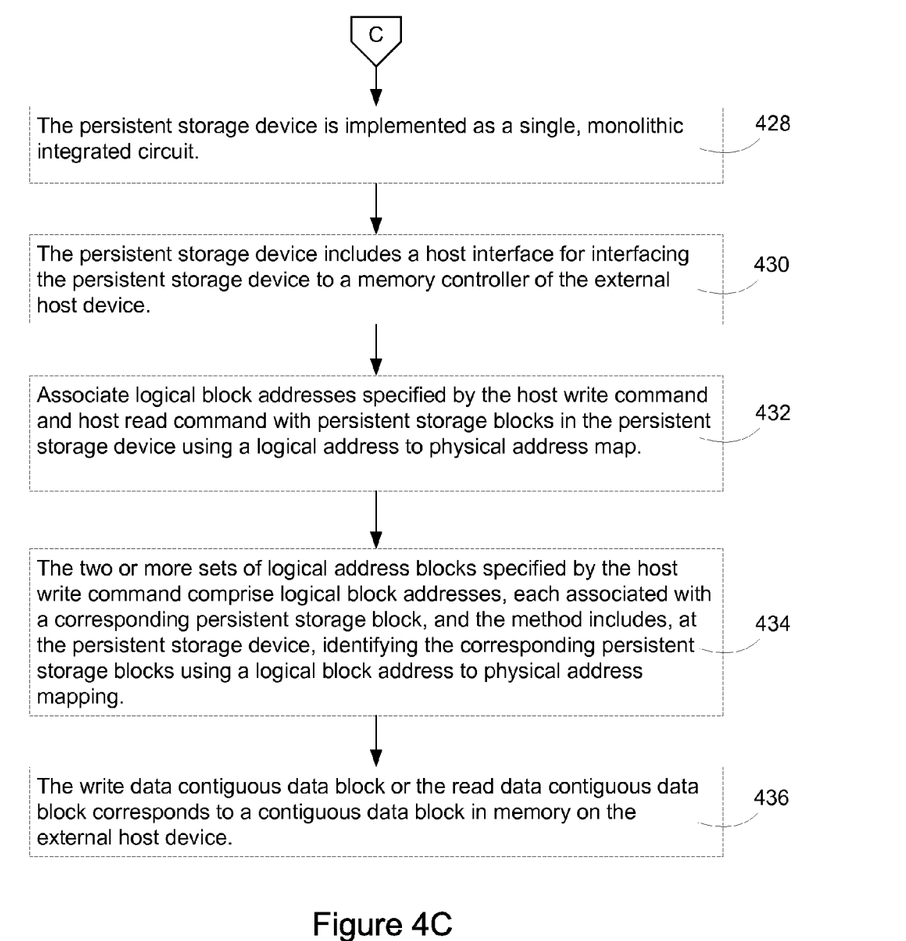

FIGS. 4A-4C illustrate a flowchart representing a method 400 for managing a persistent storage device, such as persistent storage device 106 shown in FIG. 1, according to some embodiments. Method 400 includes operations for processing host read commands and host write commands. In some embodiments, method 400 is governed by instructions that are stored in a computer readable storage medium and that are executed by one or more processors of a device, such as the one or more processors 128 of storage controller 134 of persistent storage device 106, shown in FIG. 1.

In some embodiments, persistent storage device 106 receives (402) read and write commands from external host device 102. Examples of these commands are vwrite (buf, block1, count1, block2, count2, . . . ) and vread (buf, block1, count1, block2, count2, . . . ), as described above.

If host 102 issues a host write command, for example, vwrite (buf, block1, count1, block2, count2, . . . ), then in response to the host write command, persistent storage device 106 stores (404) data from a write data contiguous data block to persistent storage blocks. In some embodiments, operation 404 corresponds to operation 306 in FIG. 3A, as described above.

If host 102 issues a read command, for example, vread (buf, block1, count1, block2, count2, . . . ), then in response to the read command, persistent storage device 106 retrieves (414) data, corresponding to a read data contiguous data block, from persistent storage blocks. In some embodiments, operation 414 corresponds to operation 312 in FIG. 3B, as described above.

With regards to both operations 404 and 414, in some embodiments, the persistent storage blocks correspond (406/416) to two or more sets of logical address blocks specified by the host write/read command. In some embodiments, each set of logical address blocks specified by the host write/read command comprises (408/418) a set of contiguous logical address blocks, but the two or more sets of logical address blocks specified by the host write/read command, in aggregate, are not contiguous (410/420). As described above, in some implementations, the execution of the host write/read command is performed atomically (412/422). In some embodiments, the two or more sets of logical address blocks specified by the host write command comprise (434) logical block addresses, each associated with a corresponding persistent storage block.

In some embodiments, the host write command specifies (424) storage of a first block of data to a first persistent storage block corresponding to a first logical address block. The host write command also specifies (424) storage of a second block of data to a second persistent storage block corresponding to a second logical address block. In some embodiments, the first and second blocks of data are contiguously stored in the write data contiguous data block and the first and second logical address blocks are noncontiguous. In some embodiments, the write data contiguous data block corresponds (436) to a contiguous data block in memory 108 of external host device 102.

In some embodiments, the host read command specifies (426) retrieval of a first block of data from a first persistent storage block corresponding to a first logical address block. The host read command also specifies (426) retrieval of a second block of data from a second persistent storage block corresponding to a second logical address block. Similar to operation 424, in some embodiments, the first and second blocks of data are, after retrieval, contiguously stored in the read data contiguous data block and the first and second logical address blocks are noncontiguous. In some embodiments, the read data contiguous data block corresponds (436) to a contiguous data block in memory 108 of external host device 102.

In some embodiments, persistent storage device 106 is implemented (428) as a single, monolithic integrated circuit. In some embodiments, the persistent storage device includes (430) host interface 126 for interfacing persistent storage device 106 to memory controller 134 of external host device 102.

In some embodiments, storage controller 134 associates (432) logical block addresses, e.g., persistent storage LBAs 202, specified by the host write command and host read command, with persistent storage blocks 204 in persistent storage device 106 using LBA to PHY mapping 206, as described above. As described above, in some embodiments, a read or write command discussed above with reference to operations 404 or 414 specifies the persistent storage block to which data is to be written by specifying an associated logical block address. In such embodiments, the corresponding persistent storage block is identified (434) using a logical block address to physical block address mapping, e.g., LBA to PHY mapping 206.

Each of the host read commands described above can be viewed as a command for "gathering" data from disparate storage blocks in persistent storage and storing the gathered data in a single contiguous data block of the host 102 that issued the read command. Similarly, each of the host write commands described above can be viewed as a command for "scattering" data from a single contiguous data block of the host 102 to multiple disparate storage blocks in persistent storage. Further, use of the host read commands and host write commands described above can be used by a host application to avoid performing garbage collection operations, as such commands largely eliminate the need to move data stored in persistent storage to a set of persistent storage blocks having a contiguous set of logical block addresses.

Each of the operations shown in FIGS. 4A-4C optionally corresponds to instructions stored in a computer memory or computer readable storage medium, such as memory 130 of storage controller 134. The computer readable storage medium optionally includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Although the terms "first," "second," etc. are used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles of the present disclosure and its practical applications, to thereby enable others skilled in the art to best utilize the disclosed embodiments and various other embodiments with various modifications as are suited to the particular use contemplated.

What is claimed is:

1. A persistent storage device, comprising:
persistent storage, comprising a set of persistent storage blocks; and
a storage controller configured to store and retrieve data in response to commands received from an external host device, the storage controller further configured to:
   in response to a host write command, store all data from a single write data contiguous data block to persistent storage blocks corresponding to two or more sets of logical address blocks specified by the host write command, each set of logical address blocks specified by the host write command comprising a set of contiguous logical address blocks, wherein the two or more sets of logical address blocks specified by the host write command, in aggregate, are not contiguous; and
   in response to a host read command, retrieve data corresponding to all locations of a single read data contiguous data block from persistent storage blocks corresponding to two or more sets of logical address blocks specified by the host read command, each set of logical address blocks specified by the host read command comprising a set of contiguous logical address blocks, wherein the two or more sets of logical address blocks specified by the host read command, in aggregate, are not contiguous.

2. The persistent storage device of claim 1, wherein the storage controller is further configured to execute the host write command atomically, such that failure of said host write command to execute results in none of said two or more sets of logical address blocks specified by the host write command being stored in said persistent storage, and successful execution of said host write command results in all of said two or more sets of logical address blocks specified by the host write command being stored in said persistent storage.

3. The persistent storage device of claim 1, wherein the storage controller is further configured to execute the host read command atomically, such that failure of said host read command to execute results in none of said two or more sets of logical address blocks specified by the host read command being read from said persistent storage into said read data contiguous data block, and successful execution of said host read command results in all of said two or more sets of logical address blocks specified by the host read command read from said persistent storage into said read data contiguous data block.

4. The persistent storage device of claim 1, wherein the host write command specifies storage of a first block of data to a first persistent storage block corresponding to a first logical address block and storage of a second block of data to a second persistent storage block corresponding to a second logical address block, wherein the first and second blocks of data are contiguously stored in the write data contiguous data block, and wherein the first and second logical address blocks are noncontiguous.

5. The persistent storage device of claim 1, wherein the host read command specifies retrieval of a first block of data from a first persistent storage block corresponding to a first logical address block and retrieval of a second block of data from a second persistent storage block corresponding to a second logical address block, wherein the first and second blocks of data are, after retrieval, contiguously stored in the read data contiguous data block, and wherein the first and second logical address blocks are noncontiguous.

6. The persistent storage device of claim 1, wherein the single write data contiguous data block is a contiguous data block in memory of the external host device.

7. The persistent storage device of claim 1, further comprising a host interface for interfacing the persistent storage device to a memory controller of the external host device.

8. The persistent storage device of claim 1, further comprising a logical address to physical address map for associating logical block addresses with persistent storage blocks in the persistent storage device.

9. The persistent storage device of claim 1, wherein the two or more sets of logical address blocks specified by the host read command comprise logical block addresses, each associated with a corresponding persistent storage block, and the corresponding persistent storage blocks are a noncontiguous set of storage blocks identified by the storage controller using a logical block address to physical address mapping.

10. The persistent storage device of claim 1, wherein the write data contiguous data block or the read data contiguous data block corresponds to a single contiguous data block in memory on the external host device.

11. A method for managing a persistent storage device, comprising:
at the persistent storage device comprising persistent storage and a storage controller, the persistent storage comprising a set of persistent storage blocks:
in response to a host write command received from an external host device, storing all data from a single write data contiguous data block to persistent storage blocks corresponding to two or more sets of logical address blocks specified by the host write command, each set of logical address blocks specified by the host write command comprising a set of contiguous logical address blocks, wherein the two or more sets of logical address blocks specified by the host write command, in aggregate, are not contiguous; and
in response to a host read command, retrieving data corresponding to all locations of a single read data contiguous data block from persistent storage blocks corresponding to two or more sets of logical address blocks specified by the host read command, each set of logical address blocks specified by the host read command comprising a set of contiguous logical address blocks, wherein the two or more sets of logical address blocks specified by the host read command, in aggregate, are not contiguous.

12. The method of claim 11, wherein execution of the host write command is performed atomically, such that failure of said host write command to execute results in none of said two or more sets of logical address blocks specified by the host write command being stored in said persistent storage, and successful execution of said host write command results in all of said two or more sets of logical address blocks specified by the host write command being stored in said persistent storage.

13. The method of claim 11, wherein execution of the host read command is performed atomically, such that failure of said host read command to execute results in none of said two or more sets of logical address blocks specified by the host read command being read from said persistent storage into said read data contiguous data block, and successful execution of said host read command results in all of said two or more sets of logical address blocks specified by the host read command read from said persistent storage into said read data contiguous data block.

14. The method of claim 11, wherein the host write command specifies storage of a first block of data to a first persistent storage block corresponding first logical address block and storage of a second block of data to a second persistent storage block corresponding to a second logical address block, wherein the first and second blocks of data are contiguously stored in the write data contiguous data block, and wherein the first and second logical address blocks are noncontiguous.

15. The method of claim 11, wherein the host read command specifies retrieval of a first block of data from a first persistent storage block corresponding first logical address block and retrieval of a second block of data from a second persistent storage block corresponding to a second logical address block, wherein the first and second blocks of data are then, after retrieval, contiguously stored in the read data contiguous data block, and wherein the first and second logical address blocks are noncontiguous.

16. The method of claim 11, wherein the single write data contiguous data block is a contiguous data block in memory of the external host device.

17. The method of claim 11, the persistent storage device further comprises a host interface for interfacing the persistent storage device to a memory controller of the external host device.

18. The method of claim 11, further comprising associating logical block addresses specified by the host write command and host read command with persistent storage blocks in the persistent storage device using a logical address to physical address map.

19. The method of claim 11, wherein the two or more sets of logical address blocks specified by the host read command comprise logical block addresses, each associated with a corresponding persistent storage block, and the corresponding persistent storage blocks are a noncontiguous set of storage blocks identified by the storage controller using a logical block address to physical address mapping.

20. The method of claim 11, wherein the write data contiguous data block or the read data contiguous data block corresponds to a single contiguous data block in memory on the external host device.

21. A non-transitory computer readable storage medium storing one or more programs for execution by a storage controller of a persistent storage device, the persistent storage device comprising persistent storage and the storage controller, the persistent storage comprising a set of persistent storage blocks, wherein the one or more programs, when executed by the storage controller of the persistent storage device, cause the persistent storage device to perform a method comprising:

in response to a host write command received from an external host device, storing all data from a single write data contiguous data block to persistent storage blocks corresponding to two or more sets of logical address blocks specified by the host write command, each set of logical address blocks specified by the host write command comprising a set of contiguous logical address blocks, wherein the two or more sets of logical address blocks specified by the host write command, in aggregate, are not contiguous; and in response to a host read command, retrieving data corresponding to all locations of a single read data contiguous data block from persistent storage blocks corresponding to two or more sets of logical address blocks specified by the host read command, each set of logical address blocks specified by the host read command comprising a set of contiguous logical address blocks, wherein the two or more sets of logical address blocks specified by the host read command, in aggregate, are not contiguous.

* * * * *